Patented Mar. 26, 1946

2,397,307

UNITED STATES PATENT OFFICE 2,397,307

DECOLORIZING PROTEIN

Merrill A. Youtz, Cincinnati, Ohio, assignor to The Drackett Company, Cincinnati, Ohio, a corporation of Ohio No Drawing. Application October 2, 1942, Serial No. 460,585

14 Claims. (Cl. 260—112)

This invention relates to methods of treating proteinaceous material and more particularly to the preparation of proteins from vegetable sources such as protein-containing seeds or the meal or flake prepared from such seeds.

It is the general object of the invention to provide a novel and improved process of preparing high quality protein from sources of the class described, which will not only be light in color but possesses all of the other qualities necessary for the making of finepaper coatings.

In the preparation of adhesive coating compositions such as paper coatings, sizes, and glues, milk casein has been extensively used and other binding substances such as starches and adhesive constituents of animal origin have also been employed. The use of milk casein in this connection is attended by a number of disadvantages, among which may be mentioned lack of uniformity of quality, fluctuation in market price from season to season, high viscosity in low water ratios, poor spreading properties, reduction in adhesive strength at moderately high humidities, low varnish and ink resistance, and objectionable odor in the final product. For these and other reasons, vegetable proteins and particularly soy bean protein, have already been proposed for use as the essential constituent of adhesive coatings, and these substances are the preferred starting materials for the practice of the present invention. These proteins possess certain natural advantages over milk casein, such as relative stability of market price, uniformity of quality, and absence of objectionable odor. Wider use of vegetable proteins has no doubt been retarded by the difficulty and expense of producing from vegetable material a protein which, when used in more or less standard formulae for the preparation of adhesive compositions, will impart to such compositions the required viscosity and adhesive strength. Another and equally important obstacle to the use of vegetable proteins in making paper coatings and other fine adhesive products, has been the impossibility of producing proteins otherwise suitable for paper coatings which have at the same time a color as light as that of good milk casein.

Previous attempts to decolorize soy bean and other vegetable proteins by means of the usual bleaching agents, such as fuller's earth, activated carbon, per salts, sulfur dioxide, and the like have failed to produce a protein of the necessary quality and light color. Apparently each of these agents which have been employed previously, have some little effect in bleaching certain of the color producing ingredients either naturally present in the soy bean or caused by previous processing, but none of them employed alone or in combination have been satisfactory in completely decolorizing the vegetable protein to approximate the quality of the milk casein in preparing such paper coatings.

In its preferred embodiment, the invention contemplates the provision of a method of extraction and decolorizing which comprises the steps of washing the substantially oil-free flake or meal with sulfur dioxide in aqueous solution, under controlled conditions of acidity and temperature, extracting the washed and treated meal with dilute alkali in the cold, and then separating the solution from the undissolved material. Any desired or necessary reduction in viscosity of the separated solution may be effected by warming it slightly and adding more alkali. In all, the amount of alkali added will ordinarily be from 5 to 10% of the weight of the original flakes.

The protein is then precipitated by adding a rather strong solution of sulfur dioxide until the iso-electric point is reached, the required pH value being from 4.0 to 4.6. The precipitated protein is washed and again suspended in water whereupon a small amount approximately 1% by weight of the original meal of sodium hydrosulfite ($Na_2S_2O_4$) solution is added. The protein is again washed, then dried and granulated. For storage or shipping, the resulting granulated product should not contain much over 6 or 7% moisture.

The sodium hydrosulfite solution may either be added to the meal suspension during the final wash with the sulfur dioxide, added to the suspension or precipitated protein before separating and drying, or the material may be treated with the sodium hydrosulfite at both of these states.

The flake or meal material, preferably obtained from soy beans may be produced by cracking the beans, flaking the cracked fragments, with or without removing the hulls, extracting the oil by the use of suitable solvents, and removing the excess solvent by subjecting the material to a very mild heating.

In effecting the initial treatment with the sulfur dioxide, the meal or flake is preferably subjected to aqueous solution of sulfur dioxide ($H_2SO_3$) several times, in order to maintain a hydrogen ion concentration of from pH 4.0 to 4.6. After each treatment the liquor may be removed by settling, filtration, or other suitable means, and the wet meal again treated with the sulfur dioxide solution. Each treatment must be continued until the pH value no longer lies outside the limits stated. During the first extraction with the sulfur dioxide solution, a considerable amount of the sulfurous acid combines with the meal and the pH value will not be reduced to the desired point, except temporarily, until the meal or the protein therein is unable to take up any further amount of sulfurous acid. Since the meal is not finely ground, but consists of relatively coarse solid pieces, the sulfurous acid must penetrate or diffuse into the interior of such pieces, and the time required to completely saturate the meal or flakes with the treating substance will of course depend upon the thickness of the granules. At the same time the soluble carbohydrates, some of the nitrogen compounds, and a portion of the protein are dissolved and must separate out from the solid pieces or flakes of the meal. If the pH value gets outside of the range specified, no particular harm will be done as respects the color of the resulting protein, but if the pH value rises to say 5.5 or falls to as low a point as 3.0, some protein will be dissolved and later precipitated when the pH value is finally adjusted by any necessary addition of sulfur dioxide solution. The resulting fine precipitate will tend to hinder subsequent filtration operations.

A specific example of the operation of the invention may be set forth as follows in order to guide a worker in the art in practicing the novel process, but no limitation of the scope of the invention is to be imported therefrom beyond that which is defined by the subjoined claims.

To 250 lbs. of substantially oil-free soy bean flakes are added 350 gals. of water containing about 5 lbs. of sulfur dioxide in solution. The mass is agitated at a temperature of approximately 20° C. for a few minutes and then additional sulfur dioxide (in strong solution) is added and the additions continued every few minutes as often as necessary to reduce the pH value to 4.0–4.6 (preferably 4.1–4.2) and to maintain it at this figure. It is probable that from 9 to 10 lbs. of sulfur dioxide will be added in all over a period of at least one hour. The solution is removed as completely as possible by filtration or centrifuging and then the meal is again mixed with 350 gals. of sulfur dioxide solution. This solution is more dilute than the original solution, comparatively little sulfur dioxide being required for the second and subsequent treatments, from one quarter to one half pound being sufficient. According to this specific example of the working of the process, the treatment with sulfur dioxide is repeated until four washes have been given. A fifth wash is given in the same manner except that two pounds of sodium hydrosulfite, in solution, are added to the sulfur dioxide wash. The liquor is removed as before and the resulting wet cake of meal is then suspended in 350 gals. of water containing 5 lbs. of caustic soda. The suspension is agitated at about 20° C. for about one-half hour. The extract liquor is removed by centrifuging and the meal is washed with 150 gals. of water containing two pounds of caustic soda, the resulting liquor again being removed by centrifuging and added to the first extract.

The combined extracts are then warmed to about 40° C. and a strong solution of 17 lbs. of caustic soda added. After digesting about two hours the protein is precipitated with a strong solution of sulfur dioxide whereby the mass is adjusted to a pH value of about 4.2. About 35 lbs. of sulfur dioxide will be required. After settling for about an hour the solution is removed by centrifuging and the cake of precipitated protein is suspended in water to which about 2 lbs. of sodium hydrosulfite in solution has been added. The mass is then gently agitated for about 4 hours or more. Then the protein is centrifuged from the liquor, again suspended, agitated, and centrifuged to a wet cake which, however, is dry enough to granulate. The material is then granulated and dried in a current of warm air at 45° C. to 50° C. until the moisture content is about 6 or 7%.

It will be understood from the earlier general description and from the specific example, that the invention essentially contemplates a process which includes the following principal steps: first, the extraction with the sulfurous acid which has the effects of preventing oxidation by the air, exerting a reducing action, and dissolving or extracting certain of the colored or color producing substances without removal of the protein; secondly, the treatment at either or both of the stages indicated, with the sodium hydrosulfite solution; third, dilute alkali extraction of the protein at controlled low temperatures; and, fourth, the precipitation of the protein by the sulfurous acid with or without the treatment with sodium hydrosulfite.

For convenience in describing the invention, several steps have been described herein essentially as batch operations. It will nevertheless be appreciated that conventional technique may be employed to permit the practice of the invention as a continuous process, for example by the use of equipment employing the counter-flow principle for the intimate contacting of solids and liquids.

When it is stated herein that the separation of certain solid and liquid materials is effected by mechanical means, it is meant that these bodies are separated by filtration, centrifuging or the like as opposed to distillation, evaporation, and similar processes.

It is further understood that various changes and modifications may be made in the processes as described herein without departing from the scope of the invention as defined in the following claims.

Having thus described the invention, what is claimed as new and desired to be secured by Letters Patent is:

1. A method of treating proteinaceous material contained in soybeans to obtain decolorized protein which is suitable for use in paper coatings, which includes the steps of washing the material in the form of a substantially oil-free meal or flake with aqueous solutions of sulfur dioxide without heating until a constant pH value of from 4.0 to 4.6 is attained, separating the material from the resulting liquor, extracting the protein from the material by treating it with an alkaline solution, separating the desired protein from the residue, precipitating the protein by the introduction of an aqueous solution of sulfur dioxide at a pH value of 4.0 to 4.6, treating the precipitated protein still in suspension with a solution of sodium hydrosulfite, and separating the protein from the liquor.

2. A method of treating proteinaceous material contained in soybeans, which method comprises the steps of treating the material in the form of a substantially oil-free meal or flake with an aqueous solution of sulfur dioxide without heating until a constant pH value of from 4.0 to 4.6 is attained, separating the treated material from the resulting liquor, treating the material with sodium hydrosulfite in aqueous solution, separating the material from the liquor, extracting the protein by treating the material with an alkaline solution, separating the dissolved protein from the residue, precipitating the protein from solution by treating it with sulfur dioxide in aqueous solution, removing the sulfur dioxide solution from the precipitate by mechanical means.

3. A method of treating proteinaceous material contained in soybeans, which method comprises the steps of treating the material in the form of a substantially oil-free meal or flake with an aqueous solution of sulfur dioxide, without heating until a constant pH value of from 4.0 to 4.6 is attained, separating the treated material from the resulting liquor by mechanical means, treating the material with sodium hydrosulfite in aqueous solution, separating the material from the liquor, extracting the protein by treating the material with an alkaline solution at approximately 20° C., separating the dissolved protein from the residue, precipitating the protein from solution by treating it with sulfur dioxide in aqueous solution, removing the sulfur dioxide solution from the precipitate by mechanical means at a temperature below 50° C., treating the precipitate with sodium hydrosulfite in aqueous solution, and separating the precipitate from the liquor.

4. A method of treating a proteinaceous material contained in soybeans, which method comprises the steps of treating the material in the form of a substantially oil-free meal or flake with an aqueous solution of sulfur dioxide added in successive increments until a constant pH value of from 4.0 to 4.6 is attained, separating the material from the treating solution by mechanical means, washing the treated material with a solution of sulfur dioxide and sodium hydrosulfite, extracting the protein by treating the washed material with an alkaline solution at about 20° C., separating the dissolved protein from the residue, precipitating the protein from solution by treating it with sulfur dioxide in aqueous solution, and removing the sulfur dioxide solution from the precipitate by mechanical means.

5. A method of treating a proteinaceous material contained in soybeans, which method comprises the steps of treating the material in the form of a substantially oil-free meal or flake with an aqueous solution of sulfur dioxide added in successive increments until a constant pH value of from 4.0 to 4.6 is attained, separating the material from the treating solution by mechanical means, washing the treated material with a solution of sulfur dioxide and sodium hydrosulfite, extracting the protein by treating the washed material with an alkaline solution at about 20° C., separating the dissolved protein from the residue, precipitating the protein from solution by treating it with sulfur dioxide in aqueous solution, and removing the sulfur dioxide solution from the precipitate by mechanical means, treating the precipitate with sodium hydrosulfite in aqueous solution, and separating the precipitate from the liquor, the material throughout the entire method being maintained at temperatures below 50° C.

6. A method of treating proteinaceous material contained in soybeans to obtain decolorized protein which is suitable for use in paper coatings, which includes the steps of washing the material in the form of a substantially oil-free meal or flake with aqueous solutions of sulfur dioxide without heating until a constant pH value of from 4.0 to 4.6 is attained, separating the material from the treating solution by mechanical means, extracting the protein from the material by treating it with an alkaline solution at approximately 20° C., separating the dissolved protein from the residue, warming the protein solution to a temperature of not over 50° C., adding more alkali and digesting for a short period of time, then precipitating the protein by the introduction of an aqueous solution of sulfur dioxide at a pH value of 4.0 to 4.6, treating the precipitated protein with a solution of sodium hydrosulfite, and separating the protein from the liquor.

7. A method of treating proteinaceous material contained in soybeans to obtain decolorized protein which is suitable for use in paper coatings, which includes the steps of adding to a quantity of the material in meal or flake form sulfur dioxide in aqueous solution until the hydrogen ion concentration of the mass remains at from pH 4.0 to pH 4.6, treating the material with sodium hydrosulfite in aqueous solution, separating the material from the treating solution by mechanical means, extracting the protein from the material by treating it with an alkaline solution at about 20° C., separating the dissolved protein from the residue, warming the protein solution to a temperature not over 50° C., adding more alkali and digesting, then precipitating the protein by the introduction of an aqueous solution of sulfur dioxide to a pH value of from 4.0 to 4.6, and separating the protein from the liquor.

8. A method of treating proteinaceous material contained in soybeans to obtain decolorized protein which is suitable for use in paper coatings, which includes the steps of adding to a quantity of the material in meal or flake form sulfur dioxide in aqueous solution until the hydrogen ion concentration of the mass remains at from pH 4.0 to pH 4.6, treating the material with sodium hydrosulfite in aqueous solution, separating the material from the treating solution by mechanical means, extracting the protein from the material by treating it with an alkaline solution at approximately 20° C., separating the dissolved protein from the residue, warming the protein solution to a temperature not over 50° C., adding more alkali and digesting, then precipitating the protein by the introduction of an aqueous solution of sulfur dioxide to a pH value of from 4.0 to 4.6, treating the precipitate with sodium hydrosulfite in aqueous solution, and separating the protein from the liquor.

9. A method of treating proteinaceous material contained in soybeans to obtain decolorized protein which is suitable for use in paper coatings, which includes the steps of adding to a quantity of the material in meal or flake form sulfur dioxide in aqueous solution until the hydrogen ion concentration of the mass remains at from pH 4.0 to pH 4.6, separating the material from the resultant liquor by mechanical means, extracting the protein from the material by treating it with a solution of sodium hydroxide at approximately 20° C., separating the dissolved protein from the residue, warming the protein solution to a temperature of not over 50° C., adding more sodium hydroxide up to a total of from 5 to 10% of the weight of flakes used, and digesting, then precipitating the protein by the introduction of an aqueous solution of sulfur dioxide to a pH value of from 4.0 to 4.6, treating the precipitate with sodium hydrosulfite in aqueous solution, and separating the protein from the liquor.

10. A method of treating proteinaceous material contained in soybeans to obtain decolorized protein which is suitable for use in paper coatings, which includes the steps of adding to a quantity of the material in meal or flake form sulfur dioxide in aqueous solution until the hydrogen ion concentration of the mass remains at from pH 4.0 to pH 4.6, treating the material with sodium hydrosulfite in aqueous solution, separating the material from the treating solution by mechanical means, extracting the protein from the material by treating it with a solution of sodium hydroxide at approximately 20° C., separating the dissolved protein from the residue, warming the protein solution to a temperature of not over 50° C., adding more sodium hydroxide up to a total of from 5 to 10% of the weight of flakes used and digesting, then precipitating the protein by the introduction of an aqueous solution of sulfur dioxide to a pH value of from 4.0 to 4.6, and separating the protein from the liquor.

11. A method of treating proteinaceous material contained in soybeans to obtain decolorized protein which is suitable for use in paper coatings, which includes the steps of adding to a quantity of the material in meal or flake form sulfur dioxide in aqueous solution until the hydrogen ion concentration of the mass remains at from pH 4.0 to pH 4.6, treating the material with sodium hydrosulfite in aqueous solution, separating the material from the treating solution by mechanical means, extracting the protein from the material by treating it with a solution of sodium hydroxide at approximately 20° C., separating the dissolved protein from the residue, warming the protein solution to a temperature of not over 50° C., adding more sodium hydroxide up to a total of from 5 to 10% of the weight of flakes used, and digesting approximately one-half hour, then precipitating the protein by the introduction of an aqueous solution of sulfur dioxide to a pH value of from 4.0 to 4.6, treating the precipitate with sodium hydrosulfite in aqueous solution, and separating the protein from the liquor.

12. A method of treating proteinaceous material contained in soybeans to obtain decolorized protein which is suitable for use in paper coatings, which includes the steps of treating a quantity of the material in meal or flake form without heating with an aqueous solution of sulfur dioxide added in successive increments until a stable pH value of from 4.0 to 4.6 is attained, separating the material from the liquor, subjecting the material to successive washings with solutions of sulfur dioxide without heating, extracting the protein from the material by treating it with successive solutions of sodium hydroxide at approximately 20° C., combining the extracts thus obtained, warming them to a temperature of not over 50° C., adding more sodium hydroxide in strong solution until the total introduced is from 5% to 10% of the weight of the original meal material used, and digesting the mass, then precipitating the protein by the introduction of an aqueous solution of sulfur dioxide to a pH value of from 4.0 to 4.6, separating the precipitate formed, and treating it with an aqueous solution of sodium hydrosulfite, the latter being in an amount equal to approximately one percent of the weight of the original meal used, and finally separating the protein from the liquor.

13. A method of treating proteinaceous material contained in soybeans to obtain decolorized protein which is suitable for use in paper coatings, which includes the steps of treating a quantity of the material in meal or flake form without heating with an aqueous solution of sulfur dioxide added in successive increments until a stable pH value of from 4.0 to 4.6 is attained, separating the material from the liquor, subjecting the material to successive washings with solutions of sulfur dioxide without heating, the final washing solution having added thereto an amount of sodium hydrosulfite equal to approximately one percent of the weight of the original meal used, extracting the protein from the material by treating it with successive solutions of sodium hydroxide at approximately 20° C., combining the extracts thus obtained, warming them to a temperature of not over 50° C., adding more sodium hydroxide in strong solution until the total introduced is from 5% to 10% of the weight of the original meal material used, and digesting the mass, then precipitating the protein by the introduction of an aqueous solution of sulfur dioxide to a pH value of from 4.0 to 4.6, and finally separating the protein from the liquor.

14. A method of treating proteinaceous material contained in soybeans to obtain decolorized protein which is suitable for use in paper coatings, which includes the steps of treating a quantity of the material in meal or flake form without heating with an aqueous solution of sulfur dioxide added in successive increments until a stable pH value of from 4.0 to 4.6 is attained, separating the material from the liquor, subjecting the material to successive washings with solutions of sulfur dioxide without heating, the final washing solution having added thereto an amount of sodium hydrosulfite equal to approximately one percent of the weight of the original meal used, extracting the protein from the material by treating it with successive solutions of sodium hydroxide at approximately 20° C., combining the extracts thus obtained, warming them to a temperature of not over 50° C., adding more sodium hydroxide in strong solution until the total introduced is from 5% to 10% of the weight of the original meal material used, and digesting the mass, then precipitating the protein by the introduction of an aqueous solution of sulfur dioxide to a pH value of from 4.0 to 4.6, separating the precipitate formed and treating it with an aqueous solution of sodium hydrosulfite the latter being in an amount equal to approximately one percent of the weight of the original meal used, and finally separating the protein from the liquor.

MERRILL A. YOUTZ.